(12) United States Patent
Marshall et al.

(10) Patent No.: US 12,252,099 B1
(45) Date of Patent: Mar. 18, 2025

(54) VARIABLE AIRFOIL PROFILE HOLLOW WIPER ARMS

(71) Applicant: Rosemount Aerospace Inc., Burnsville, MN (US)

(72) Inventors: Travis H. Marshall, West Hartford, CT (US); Alexander N. Reid, St. Louis Park, MN (US); Greg A. Seidel, Lakeville, MN (US); Nitin Chandola, Fort Walton Beach, FL (US); Saugata Sarkar, Farmington, CT (US); Ranadip Acharya, Glastonbury, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 18/137,617

(22) Filed: Apr. 21, 2023

(51) Int. Cl.
B60S 1/34 (2006.01)
B60S 1/04 (2006.01)

(52) U.S. Cl.
CPC .......... *B60S 1/3431* (2013.01); *B60S 1/3425* (2013.01); *B60S 1/3427* (2013.01); *B60S 1/3434* (2013.01); *B60S 1/3436* (2013.01); *B60S 1/3438* (2013.01); *B60S 1/0408* (2013.01)

(58) Field of Classification Search
CPC .... B60S 1/3425; B60S 1/3427; B60S 1/3429; B60S 1/3431; B60S 1/3434; B60S 1/3436; B60S 1/3438; B60S 1/344; B60S 1/0408
USPC ......................... 15/250.351, 250.352, 250.34
See application file for complete search history.

(56) References Cited

U.S. PATENT DOCUMENTS

| | | | |
|---|---|---|---|
| 6,158,079 A * | 12/2000 | Shibata | B60S 1/3468 |
| | | | 15/250.201 |
| 6,212,730 B1 * | 4/2001 | Kalbas | B60S 1/32 |
| | | | 15/250.04 |
| 6,739,018 B1 | 5/2004 | Jallet et al. | |
| 8,336,158 B2 | 12/2012 | Stankiewicz et al. | |
| 10,919,499 B2 | 2/2021 | Jarasson et al. | |
| 2004/0078919 A1 * | 4/2004 | Buchanan, Jr. | B60S 1/3427 |
| | | | 15/250.3 |

(Continued)

FOREIGN PATENT DOCUMENTS

DE 19747857 A1 * 5/1999
EP 0525850 A1 2/1993

(Continued)

OTHER PUBLICATIONS

European Search Report received in EP Application No. 24171673.7, Nov. 13, 2024, 10 pages.

*Primary Examiner* — Gary K. Graham
(74) *Attorney, Agent, or Firm* — Suiter Swantz IP

(57) ABSTRACT

A wiper apparatus includes a wiper axis interface configured for mounting a wiper assembly to a wiper drive. A lower wiper arm extends from the wiper axis interface to a wiper mount that is configured to connect the lower arm to an upper arm. A first end of the lower wiper arm proximate the wiper axis interface has a first airfoil profile and wall thickness. A second end of the lower wiper arm proximate the wiper mount has a second airfoil profile and wall thickness. An intermediate portion of the lower wiper arm extending between the first and second ends has a transitioning airfoil profile and thickness that transitions from the first airfoil profile and wall thickness to the second airfoil profile and wall thickness.

12 Claims, 4 Drawing Sheets

(56) References Cited

U.S. PATENT DOCUMENTS

2008/0289137 A1   11/2008   Ciaccio et al.

FOREIGN PATENT DOCUMENTS

| EP | 0670252 | A1 | 9/1995 |
| EP | 3162644 | A1 | 5/2017 |
| FR | 2938807 | * | 11/2008 |

* cited by examiner

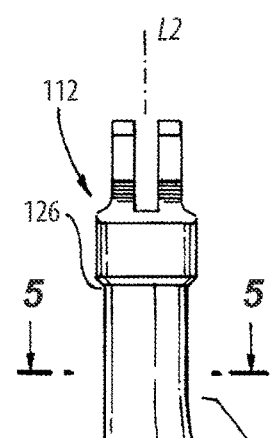
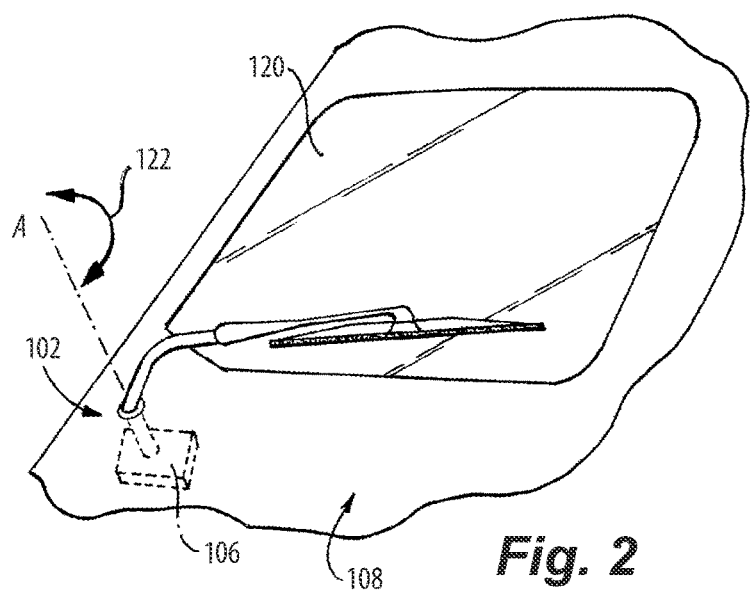
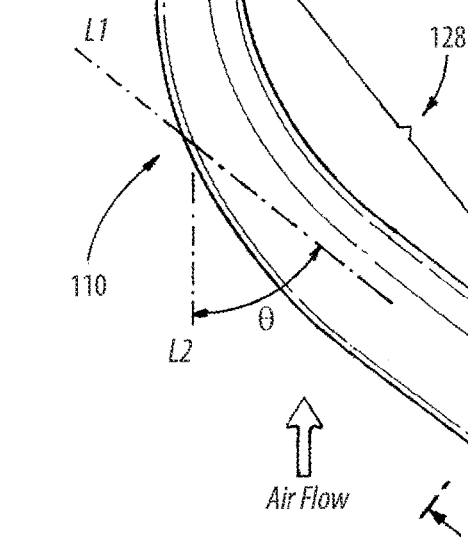
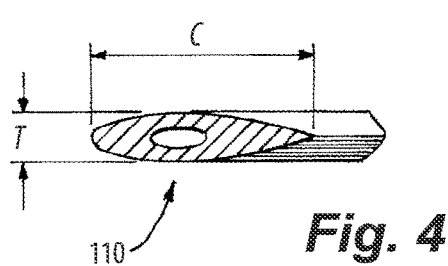
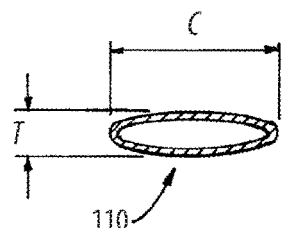
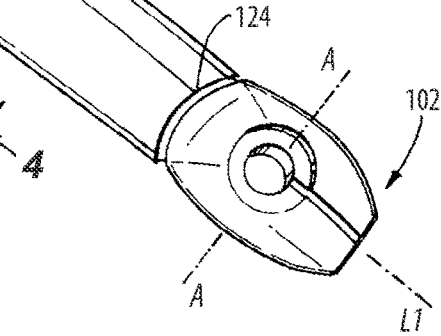
Fig. 2
Fig. 3
Fig. 4
Fig. 5

VARIABLE AIRFOIL PROFILE HOLLOW WIPER ARMS

BACKGROUND

1. Field

The present disclosure relates to wiper arms for windshield wipers, and more particularly to wiper arms for windshield wipers such as used on aircraft cockpits.

2. Description of Related Art

Traditional aircraft windshield wiper arms for aircraft cockpits are manufactured from metallic materials such as stainless steels. They are sized for the loading of the wiper blade assembly during operation. Drag induced by this component affects the mechanical loading of the wiper system, which in turn drives the sizing of the wiper arm and life of the wiper system.

The conventional techniques have been considered satisfactory for their intended purpose. However, there is an ever present need for improved systems and methods for wiper arms such as for use with aircraft cockpit windshields. This disclosure provides a solution for this need.

SUMMARY

A wiper apparatus includes a wiper axis interface configured for mounting a wiper assembly to a wiper drive. A lower wiper arm extends from the wiper axis interface to a wiper mount that is configured to connect the lower arm to an upper arm. A first end of the lower wiper arm proximate the wiper axis interface has a first airfoil profile. A second end of the lower wiper arm proximate the wiper mount has a second airfoil profile. An intermediate portion of the lower wiper arm extending between the first and second ends has a transitioning airfoil profile that transitions from the first airfoil profile to the second airfoil profile.

The first airfoil profile can have a smaller maximum thickness than that of the second airfoil profile. The first airfoil profile can have ca longer chord line than that of the second airfoil profile. The lower wiper arm can define a curve so a first longitudinal axis of the lower wiper arm defined by the first end is oblique relative to a second longitudinal axis of the lower arm defined at the second end.

The upper arm can be connected to the wiper mount. A bridge can be mounted to an end of the upper arm opposite the wiper mount. A wiper blade can be operatively connected to the bridge for wiping a windshield. The wiper axis interface can be mounted to the wiper drive so the wiper drive can drive the lower wiper arm with reciprocating motion about a rotation axis defined by the wiper axis interface.

An outer wall of the lower wiper arm can be defined about a hollow core of the lower wiper arm. At the first end of the lower wiper arm, the outer wall can have a first wall thickness. At the second end of the lower wiper arm, the outer wall can have a second wall thickness different from the first thickness. Along the intermediate portion, the outer wall can have a transitioning wall thickness that transitions from the first wall thickness to the second wall thickness.

The transitioning airfoil profile can transition smoothly from the first airfoil profile to the second airfoil profile. The first wall thickness can be thicker than the second wall thickness. The transitioning thickness can transition smoothly from the first wall thickness to the wall second thickness. The hollow core can terminate at a first bore opening into a connector bore of the wiper axis interface. The hollow core can terminate at a second bore opening into a clevis of the wiper mount.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 2 is a schematic perspective view of the wiper apparatus of FIG. 1, showing the wiper axis;

FIG. 3 is a plan view of the lower wiper arm of the wiper apparatus of FIG. 1, showing bend in the lower wiper arm;

FIG. 4 is a cross-sectional view of the lower arm of FIG. 3, showing the airfoil profile proximate the first end of the lower wiper arm located as indicated in FIG. 3;

FIG. 5 is a cross-sectional view of the lower arm of FIG. 3, showing the airfoil profile proximate the second end of the lower wiper arm located as indicated in FIG. 3;

DETAILED DESCRIPTION OF THE PREFERRED EMBODIMENTS

Figure 1:
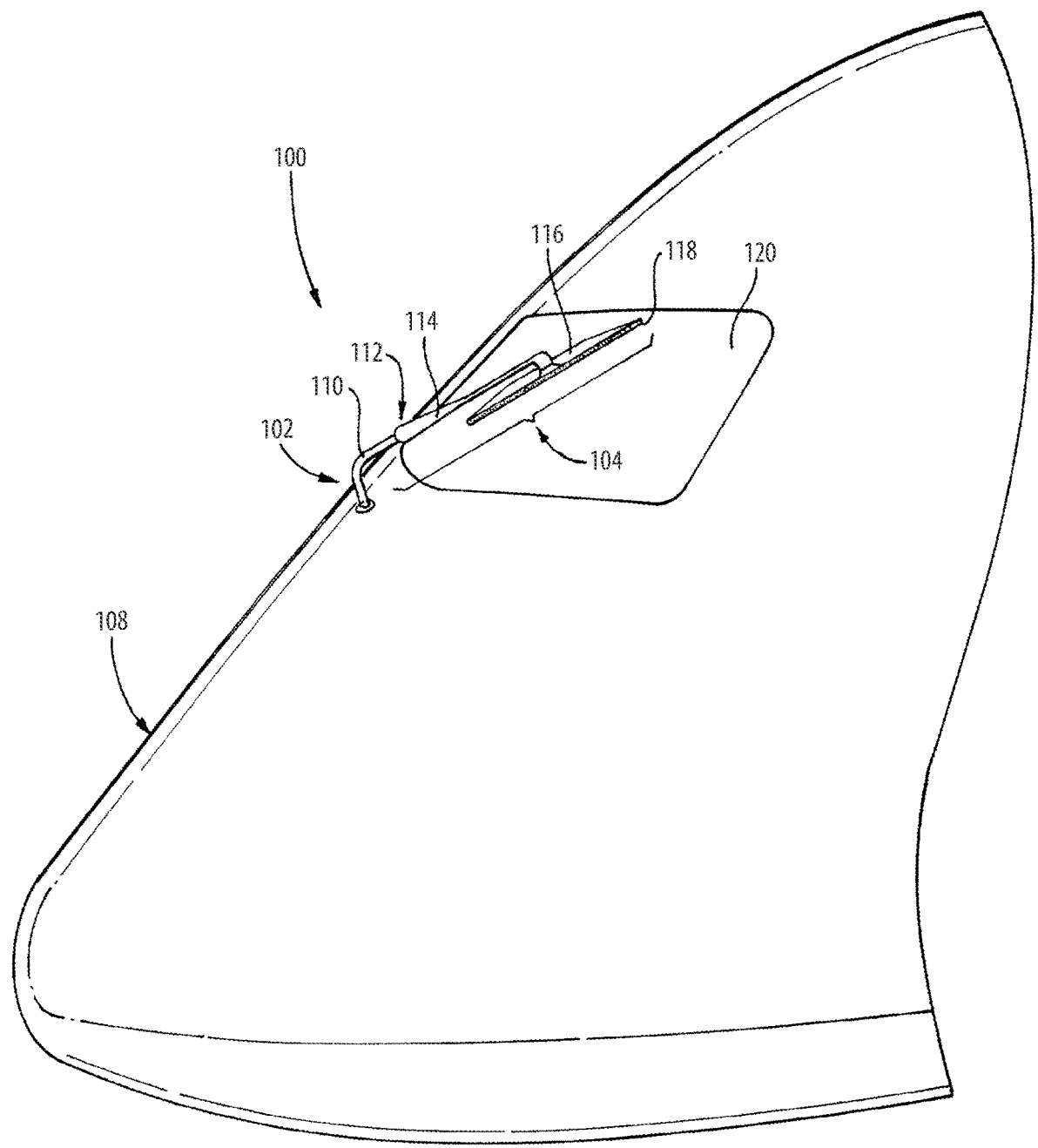
FIG. 1 is a schematic perspective view of an embodiment of a wiper apparatus constructed in accordance with the present disclosure, showing the components of the wiper assembled onto an aircraft cockpit windshield.

Reference will now be made to the drawings wherein like reference numerals identify similar structural features or aspects of the subject disclosure. For purposes of explanation and illustration, and not limitation, a partial view of an embodiment of a wiper apparatus in accordance with the disclosure is shown in FIG. 1 and is designated generally by reference character 100. Other embodiments of systems in accordance with the disclosure, or aspects thereof, are provided in FIGS. 2-8, as will be described. The systems and methods described herein can be used to improve aerodynamics, weight, manufacturability, and overall performance of wiper arms and wiper systems such as for use on aircraft cockpit windshields.

The wiper apparatus 100 includes a wiper axis interface 102 mounting the wiper assembly 104 to a wiper drive 106 (labeled in FIG. 2) of an aircraft 108. A lower wiper arm 110 extends from the wiper axis interface 102 to a wiper mount 112, which is in the form of a clevis, that is connects the lower arm 110 to an upper arm 114. A bridge 116 is mounted to an end of the upper arm 114 opposite the wiper mount 112. A wiper blade 118 is operatively connected to the bridge 116 for wiping the cockpit windshield 120. Referring to FIG. 2, the wiper axis interface 102 is mounted to the wiper drive 106 so the wiper drive 106 can drive the lower wiper arm 110 (and therefore the entire wiper assembly 104) with reciprocating motion about a rotation axis A defined by the wiper axis interface 102. The reciprocating motion is in the direction of the double headed arrow 122 in FIG. 2.

With reference now to FIG. 3, a first end 124 of the lower wiper arm 110 proximate the wiper axis interface 102 has a first airfoil profile, i.e. the cross-section at the location indicated in FIG. 3 and shown in FIG. 4. A second end 126 of the lower wiper arm 110 proximate the wiper mount 112 has a second airfoil profile, i.e. the cross section at the location indicated in FIG. 3 and shown in FIG. 5. An intermediate portion 128 of the lower wiper arm 110 extends between the first and second ends 124, 126 and has a transitioning airfoil profile that transitions smoothly, i.e. continuously from the first airfoil profile shown in FIG. 3 to the second airfoil profile shown in FIG. 4. The lower wiper arm 110 defines a curve in the intermediate portion 128 so a first longitudinal axis L1 of the lower wiper arm defined by the first end is oblique relative to a second longitudinal axis of the lower arm defined at the second end, e.g. by an angle θ of about 30-degrees but those skilled in the art will readily appreciate that any suitable angle θ can be used without departing from the scope of this disclosure.

The aerodynamics of these airfoil profiles provide for reduced forces on the lower wiper arm 110 in most positions of the reciprocating motion in FIG. 1, e.g. including for the airflow direction indicated by the large arrow in FIG. 3. FIGS. 4 and 5 show the chord lengths C and the maximum thicknesses T for the first and second airfoil profiles. The portion of the lower arm 110 that is most transverse to the air flow direction indicated in FIG. 3 is the portion with the airfoil profile having the highest ratio C/T of chord length C to maximum chord thickness T, i.e. is the most streamlined portion to flow transverse to the airfoil. The ratio of C/T changes smoothly along the length of the intermediate portion 128. The portion of the lower arm 110 that is least transverse to the air flow direction indicated in FIG. 3 is the portion with the lowest ratio of C/T, i.e. the least streamlined portion to flow transverse to the airfoil. The first airfoil profile, shown in FIG. 4 has a smaller maximum thickness T than that of the second airfoil profile shown in FIG. 5. The first airfoil profile shown in FIG. 4 has a longer chord line C than that of the second airfoil profile shown in FIG. 5.

Figure 6:
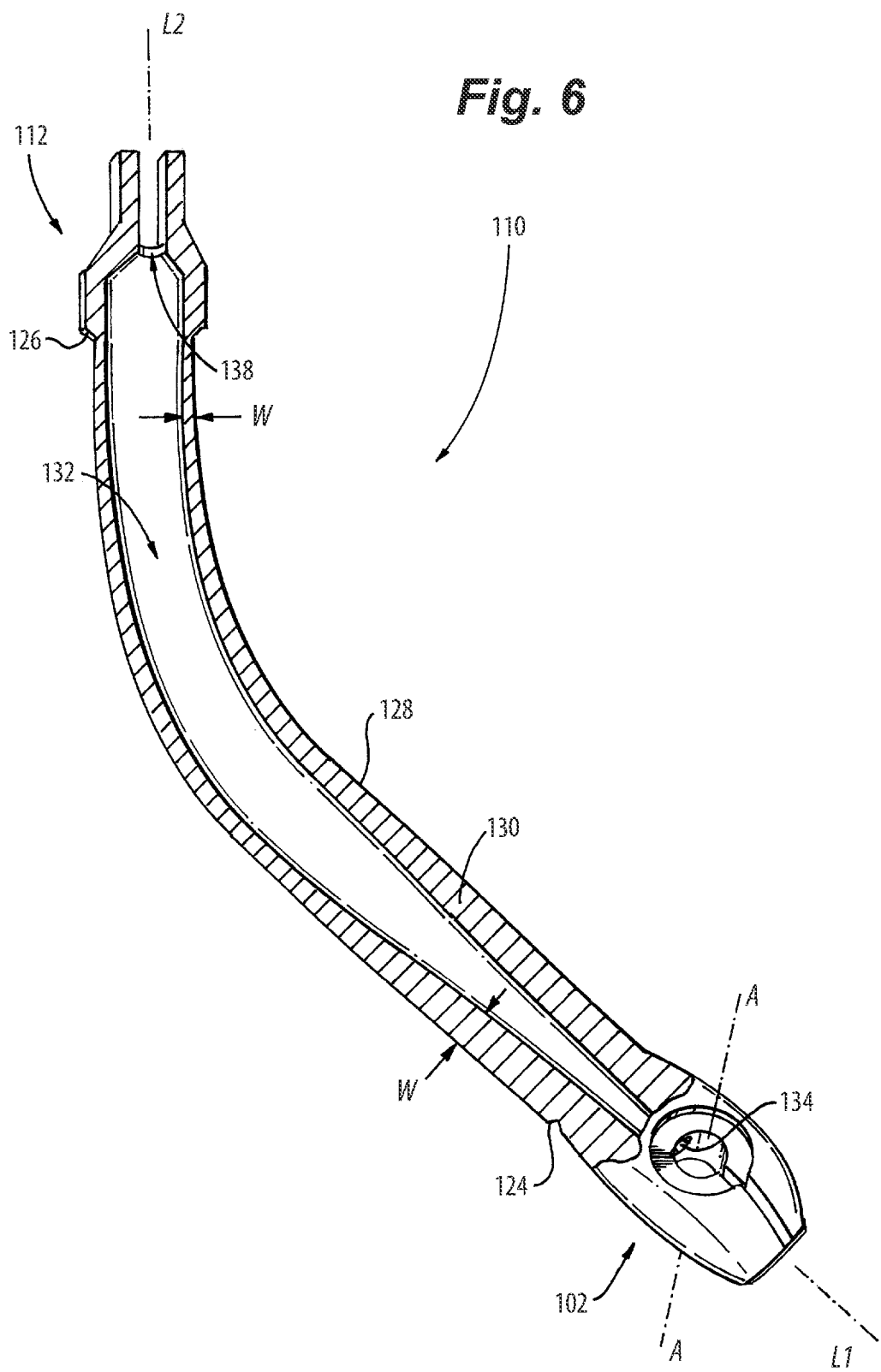
FIG. 6 is a cross-sectional plan view of the lower arm of FIG. 3, showing a configuration of a hollow core.

With reference now to FIG. 6, the lower wiper arm 110 can be hollow, in which case an outer wall 130 of the lower wiper arm 110 is defined about a hollow core 132 of the lower wiper arm 110. At the first end 124 of the lower wiper arm, the outer wall 130 has a first wall thickness W. At the second end 126 of the lower wiper arm 110, the outer wall 130 has a second wall thickness W different from the first wall thickness. Along the intermediate portion 128, the outer wall 130 has a transitioning wall thickness W that transitions from the first wall thickness W to the second wall thickness W. This does not imply that each local thickness along the length is locally uniform in thickness, e.g. in a hoop direction around the outer wall 130, but instead the thickness can also very in the hoop direction in addition to in the end to end length direction of the lower wiper arm 110. The transitioning wall thickness transitions smoothly, i.e. continuously, from the first wall thickness W to the second wall thickness W. Smooth transition for the wall thickness may not be required, e.g. provided all external surface transition is smoothly maintained. The first wall thickness W, i.e. proximate the first end 124, is thicker than the second wall thickness W, i.e. proximate the second end 126. This thickness profile of the outer wall 130 allows for reduced weight relative to solid lower arm designs, while still providing the material strength where needed.

Figure 7:
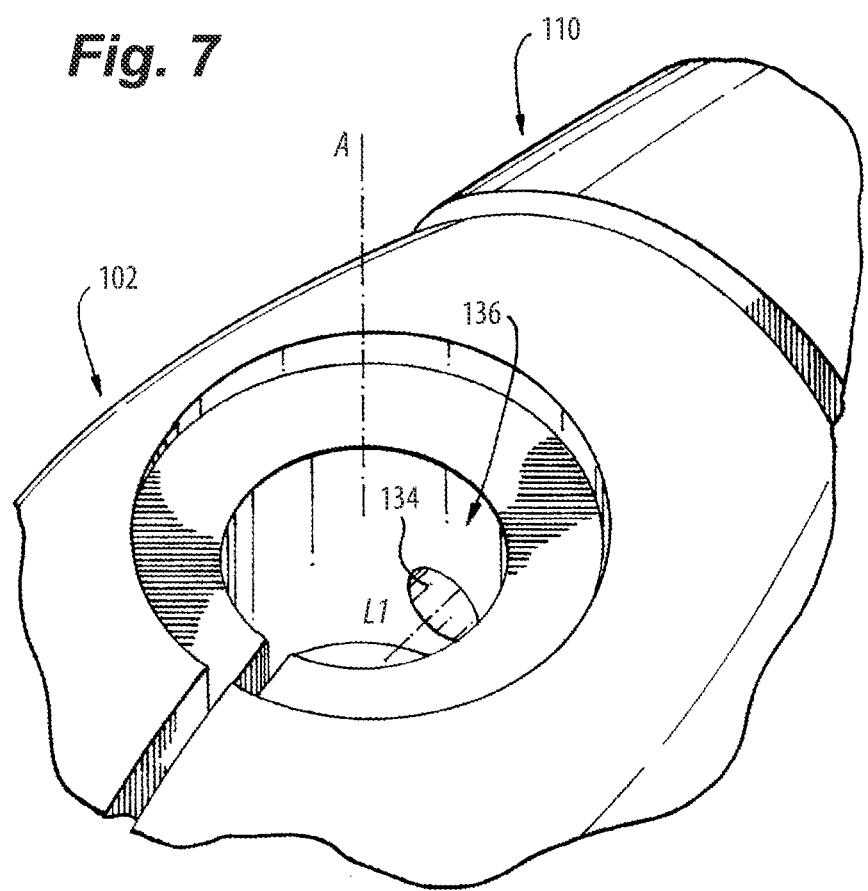
FIG. 7 is a perspective view of a first end of the lower arm of FIG. 6, showing a first bore into the hollow core.
Figure 8:
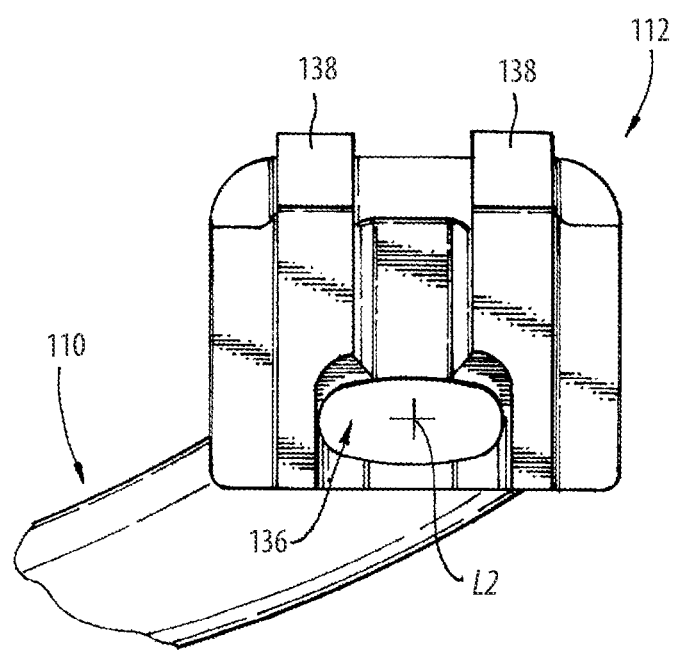
FIG. 8 is a perspective view of a second end of the lower arm of FIG. 6, showing a second pore into the hollow core.

The hollow core 132 terminates at a first bore 134 that opens into a connector bore 136 of the wiper axis interface 102, wherein the first bore 134 extends along the first longitudinal axis L1, as shown in FIG. 7. The hollow core 132 of FIG. 3 also terminates at a second bore 136 opening into the clevis 138 of the wiper mount, and extends along the second longitudinal axis L2, as shown in FIG. 8. The first and second bores 134, 136 allow draining of additive manufacturing stock powder out of the hollow core 132, labeled in FIG. 3, after building the lower arm 110 in an additive manufacturing process. However, in the wiper assembly 104 of FIG. 1, the first bore 134 of FIG. 1 is covered by a pin 140 of the wiper drive 106, and the second bore 136 is covered by the upper arm 114 connecting in the clevis 138 labeled in FIG. 8. This prevents water, ice, sand, dust, bugs, or other contaminants entering the hollow core 132 during use in flight or the like. These bores 134, 136 are the only opening into the hollow core 132 as shown in FIG. 3. The hollow core 132 is not an open channel, but a hollow core completely surrounded by the outer wall 132 but for the first and second bores 134, 136 of FIGS. 7-8.

Systems and methods as disclosed herein can provide various potential benefits including the following. The cross section of the lower arm can be optimized with an airfoil shape with much lower drag than traditional configurations. This lowers drag on the aircraft, e.g. for fuel economy, and reduces loading on the wiper apparatus as a whole, leading to longer system life. The lower wiper arm can be structurally optimized as the airfoil profile can be stiffer in the bending direction of the lower arm than in traditional configurations. The airfoil profile sizing can also be driven by structural need as the highest stressed areas near the wiper axis interface can have the highest cross-sectional area and wall thickness, and the airfoil area and wall thickness can be reduced closer to the wiper mount.

The methods and systems of the present disclosure, as described above and shown in the drawings, provide for improved aerodynamics, weight, manufacturability, and overall performance of wiper arms and wiper systems such as for use on aircraft cockpit windshields. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A wiper apparatus comprising:
   a wiper axis interface configured for mounting a wiper assembly to a wiper drive; and
   a lower wiper arm extending from the wiper axis interface to a wiper mount that is configured to connect the lower arm to an upper arm, wherein a first end of the lower wiper arm proximate the wiper axis interface has a first airfoil profile, wherein a second end of the lower wiper arm proximate the wiper mount has a second airfoil profile, and wherein an intermediate portion of the lower wiper arm extending between the first and second ends has a transitioning airfoil profile that transitions from the first airfoil profile to the second airfoil profile, wherein an outer wall of the lower wiper arm is defined about a hollow core of the lower wiper arm, wherein at the first end of the lower wiper arm, the outer wall has a first wall thickness, wherein at the second end of the lower wiper arm, the outer wall has a second wall thickness different from the first wall thickness, and wherein along the intermediate portion, the outer wall has a transitioning wall thickness that transitions from the first wall thickness to the second wall thickness, wherein the hollow core terminates at a first bore opening into a connector bore of the wiper axis interface, wherein the hollow core terminates at a second bore opening into a clevis of the wiper mount.

2. The apparatus as recited in claim 1, wherein the first airfoil profile has a smaller maximum thickness than that of the second airfoil profile.

3. The apparatus as recited in claim 1, wherein the first airfoil profile has a longer chord line than that of the second airfoil profile.

4. The apparatus as recited in claim 1, wherein the lower wiper arm defines a curve so a first longitudinal axis of the lower wiper arm defined by the first end is oblique relative to a second longitudinal axis of the lower arm defined at the second end.

5. The apparatus as recited in claim 1, further comprising:
the upper arm connected to the wiper mount;
a bridge mounted to an end of the upper arm opposite the wiper mount; and
a wiper blade operatively connected to the bridge for wiping a windshield.

6. The apparatus as recited in claim 5, further comprising the wiper drive, wherein the wiper axis interface is mounted to the wiper drive so the wiper drive can drive the lower wiper arm with reciprocating motion about a rotation axis defined by the wiper axis interface.

7. The apparatus as recited in claim 1, wherein the transitioning airfoil profile transitions smoothly from the first airfoil profile to the second airfoil profile.

8. A wiper apparatus comprising:
a wiper axis interface configured for mounting a wiper assembly to a wiper drive; and
a lower wiper arm extending from the wiper axis interface to a wiper mount that is configured to connect the lower arm to an upper arm, wherein an outer wall of the lower wiper arm is defined about a hollow core of the lower wiper arm,
wherein at a first end of the lower wiper arm proximate the wiper axis interface, the outer wall has a first wall thickness, wherein at a second end of the lower wiper arm proximate the wiper mount, the outer wall has a second wall thickness different from the first wall thickness, and wherein along an intermediate portion of the lower wiper arm extending between the first and second ends, the outer wall has a transitioning wall thickness that transitions from the first wall thickness to the second wall thickness, wherein the hollow core terminates at a first bore opening into a connector bore of the wiper axis interface, wherein the hollow core terminates at a second bore opening into a clevis of the wiper mount.

9. The apparatus as recited in claim 8, wherein the first wall thickness is thicker than the second wall thickness, and wherein the transitioning wall thickness transitions smoothly from the first wall thickness to the second wall thickness.

10. The apparatus as recited in claim 8, wherein the lower wiper arm defines a curve so a first longitudinal axis of the lower wiper arm defined by the first end is oblique relative to a second longitudinal axis of the lower arm defined at the second end.

11. The apparatus as recited in claim 8, further comprising:
an upper arm connected to the wiper mount;
a bridge mounted to an end of the upper arm opposite the wiper mount; and
a wiper blade operatively connected to the bridge for wiping a windshield.

12. The apparatus as recited in claim 11, further comprising a wiper drive of an aircraft, wherein the wiper axis interface is mounted to the wiper drive so the wiper drive can drive the lower wiper arm with reciprocating motion about a rotation axis defined by the wiper axis interface.

* * * * *